United States Patent
Yeh

(10) Patent No.: US 8,386,699 B2
(45) Date of Patent: Feb. 26, 2013

(54) METHOD FOR GIVING PROGRAM COMMANDS TO FLASH MEMORY FOR WRITING DATA ACCORDING TO A SEQUENCE, AND CONTROLLER AND STORAGE SYSTEM USING THE SAME

(75) Inventor: Chih-Kang Yeh, Kinmen County (TW)

(73) Assignee: Phison Electronics Corp., Miaoli (TW)

( * ) Notice: Subject to any disclaimer, the term of this patent is extended or adjusted under 35 U.S.C. 154(b) by 685 days.

(21) Appl. No.: 12/580,062

(22) Filed: Oct. 15, 2009

(65) Prior Publication Data

US 2011/0055457 A1    Mar. 3, 2011

(30) Foreign Application Priority Data

Aug. 31, 2009   (TW) ............................... 98129290 A

(51) Int. Cl.
*G06F 12/00* (2006.01)
*G06F 13/00* (2006.01)
*G06F 13/28* (2006.01)

(52) U.S. Cl. ..................... 711/103; 711/154; 711/170

(58) Field of Classification Search .................. 711/103, 711/154, 170

See application file for complete search history.

(56) References Cited

U.S. PATENT DOCUMENTS

| 5,878,020 | A * | 3/1999 | Takahashi .................. 369/59.25 |
| 2002/0097594 | A1 * | 7/2002 | Bruce et al. ..................... 365/49 |
| 2007/0168839 | A1 * | 7/2007 | Kunishige et al. ............ 714/770 |

FOREIGN PATENT DOCUMENTS

| CN | 1914627 | 2/2007 |
| CN | 101196850 | 6/2008 |

OTHER PUBLICATIONS

"First Office Action of China Counterpart Application", issued on Oct. 20, 2011, p. 1-p. 9.

* cited by examiner

*Primary Examiner* — Christian P Chace
*Assistant Examiner* — Ryan Bertram
(74) *Attorney, Agent, or Firm* — J.C. Patents

(57) ABSTRACT

A method for giving program commands to a flash memory chip is provided, the method is suitable for writing data from a host system into the flash memory chip. In the present method, a plurality of host write commands and data corresponding to the host write commands are received from the host system by using a native command queuing (NCQ) protocol, and cache program commands are gived to the flash memory chip to write the data into the flash memory chip. Accordingly, the time for executing the host write commands is effectively shortened by writing the data through the cache program commands and the NCQ protocol.

18 Claims, 7 Drawing Sheets

METHOD FOR GIVING PROGRAM COMMANDS TO FLASH MEMORY FOR WRITING DATA ACCORDING TO A SEQUENCE, AND CONTROLLER AND STORAGE SYSTEM USING THE SAME

CROSS-REFERENCE TO RELATED APPLICATION

This application claims the priority benefit of Taiwan application serial no. 98129290, filed on Aug. 31, 2009. The entirety of the above-mentioned patent application is hereby incorporated by reference herein and made a part of specification.

BACKGROUND

1. Technology Field

The present invention relates to a method for giving program commands to a flash memory, and a flash memory controller and a flash memory storage system using the same.

2. Description of Related Art

Flash memory is one of the most adaptable memories for portable electronic products due to its data non-volatility, low power consumption, small volume, and non-mechanical structure. For example, a solid state drive (SSD) is a storage device that uses a NAND flash memory as its storage medium, and which has been broadly used in notebook computers as the main storage device.

FIG. 1 is a schematic block diagram of a flash memory storage system. Generally speaking, when a host system 110 is coupled to the flash memory storage device 120 through a connector 122 and is about to store data into the flash memory storage device 120, the procedure for writing the data into a flash memory module 126 of the flash memory storage device 120 can be divided into a data transferring stage and a data programming stage. To be specific, when the host system 110 is about to store data into the flash memory storage device 120, a flash memory controller 124 transmits the data into a buffer area 132 in the flash memory module 126 through a data input/output bus 128, and then the flash memory module 126 programs the data in the buffer area 132 into a memory cell (i.e., a storage area) 134 in the flash memory module 126, wherein the flash memory module 126 is in a busy status during it programs the data into the memory cell 134, and the flash memory controller 124 cannot give any command or transmit any data to the flash memory module 126 when the flash memory module 126 is in the busy status. Namely, the flash memory controller 124 can only respond to the host system 110 and process a next command of the host system 110 after the flash memory module 126 finishes programming the data.

To be specific, when the flash memory controller 124 receives a host write command and data from the host system 110 and accordingly is about to write the data into the flash memory module 126, the flash memory controller 124 gives a program command through the data input/output bus 128, and the related information in the program command is temporarily stored in the buffer area 132. For example, the program command is composed of strings such as "command W1", "physical address", "data", and "command W2", etc. The flash memory controller 124 requests the flash memory module 126 to get ready for a programming procedure through the "command W1", provides the flash memory module 126 with the address to be programmed through the "physical address", provides the flash memory module 126 with the data to be programmed through the "data", and requests the flash memory module 126 to start executing the programming procedure through the "command W2". Thus, when the flash memory module 126 starts to write the data in the buffer area 132 into the memory cell 134 according to the "command W2" in the program command, the flash memory controller 124 only responds to the host system 110 after it receives an acknowledgement message indicating that the programming procedure is finished from the flash memory module 126. Generally speaking, the time period from the host system giving the command to the host system receiving the acknowledgement message is referred to as a response time.

The transmission speed of connectors has been greatly increased along with the development of transmission technology. For example, a serial advanced technology attachment (SATA) connector can transmit data of up to 1.5 gigabit (Gb) per second or even 30 Gb/second. However, the speed for programming a flash memory is much lower than the transmission speed of a connector. As a result, the overall performance cannot be improved. Thereby, how to shorten the time for executing host write commands is one of the major subjects in the industry.

Nothing herein should be construed as an admission of knowledge in the prior art of any portion of the present invention. Furthermore, citation or identification of any document in this application is not an admission that such document is available as prior art to the present invention, or that any reference forms a part of the common general knowledge in the art.

SUMMARY

Accordingly, the present invention is directed to a method for giving program commands that can effectively shorten the time for executing host write commands.

The present invention is directed to a flash memory controller that can effectively shorten the time for executing host write commands.

The present invention is directed to a flash memory storage system that can effectively shorten the time for executing host write commands.

According to an exemplary embodiment of the present invention, a method for giving program commands is provided, wherein the method is suitable for writing data from a host system into a flash memory chip. The present method includes providing a flash memory controller and receiving a plurality of host write commands from the host system by using a native command queuing (NCQ) protocol through the flash memory controller. The present method also includes sending a command giving sequence to the host system according to the host write commands through the flash memory controller. The present method further includes sequentially receiving the host write commands and data corresponding to the host write commands from the host system according to the command giving sequence and respectively giving a cache program command to the flash memory chip to write the data into the flash memory chip.

According to an exemplary embodiment of the present invention, a flash memory controller for writing data from a host system into a flash memory chip is provided. The flash memory controller includes a microprocessor unit, a buffer memory, a flash memory interface unit, a host interface unit, and a memory management unit. The flash memory interface unit is coupled to the microprocessor unit and configured to connect to the flash memory chip. The buffer memory is coupled to the microprocessor unit. The host interface unit is coupled to the microprocessor unit and configured to connect to the host system, wherein the host interface unit supports a NCQ protocol. The memory management unit is coupled to the microprocessor unit and receives a plurality of host write commands from the host system through the host interface unit by using the NCQ protocol. Besides, the memory management unit sends a command giving sequence to the host system according to the host write commands through the host interface unit. Moreover, the memory management unit sequentially receives the host write commands and data corresponding to the host write commands from the host system according to the command giving sequence through the host interface unit and respectively gives a cache program command to the flash memory chip to write the data into the flash memory chip.

According to an exemplary embodiment of the present invention, a flash memory storage system for storing data from a host system is provided. The flash memory storage system includes a connector for coupling to the host system, a flash memory chip, and a flash memory controller, wherein the connector supports a NCQ protocol. The flash memory controller is coupled to the connector and the flash memory chip, and receives a plurality of host write commands from the host system through the connector by using the NCQ protocol. Besides, the flash memory controller sends a command giving sequence to the host system according to the host write commands. Moreover, the flash memory controller sequentially receives the host write commands and data corresponding to the host write commands from the host system through the connector according to the command giving sequence and respectively gives a cache program command to the flash memory chip to write the data into the flash memory chip.

As described above, a method for giving program commands, a flash memory controller, and a flash memory storage system are provided in exemplary embodiments of the present invention, wherein the time for executing host write commands is effectively shortened and accordingly the data access efficiency is improved.

It should be understood, however, that this Summary may not contain all of the aspects and embodiments of the present invention, is not meant to be limiting or restrictive in any manner, and that the invention as disclosed herein is and will be understood by those of ordinary skill in the art to encompass obvious improvements and modifications thereto.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1:
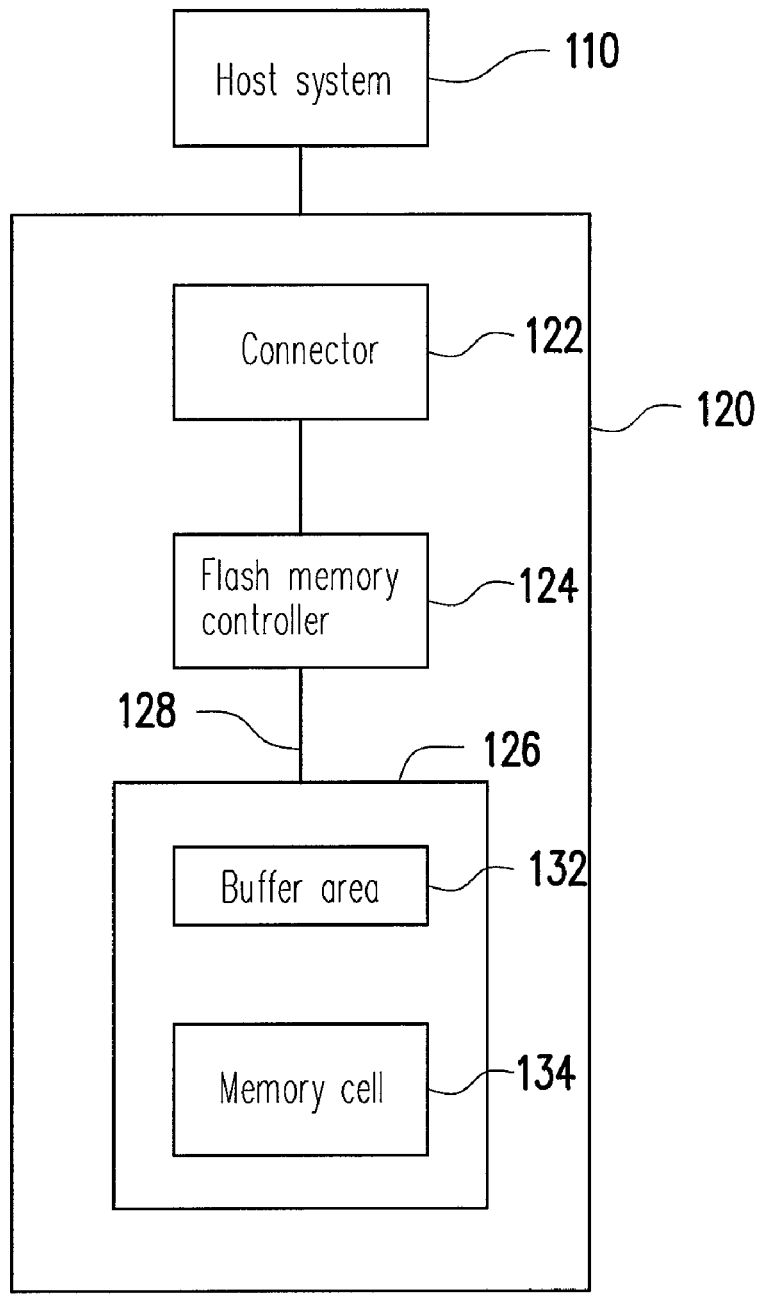
FIG. 1 is a schematic block diagram of a flash memory storage system.

Reference will now be made in detail to the present preferred embodiments of the invention, examples of which are illustrated in the accompanying drawings. Wherever possible, the same reference numbers are used in the drawings and the description to refer to the same or like parts.

Embodiments of the present invention may comprise any one or more of the novel features described herein, including in the Detailed Description, and/or shown in the drawings. As used herein, "at least one", "one or more", and "and/or" are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together.

It is to be noted that the term "a" or "an" entity refers to one or more of that entity. As such, the terms "a" (or "an"), "one or more" and "at least one" can be used interchangeably herein.

A flash memory storage device usually includes a flash memory chip and a controller (also referred to as a control circuit). The flash memory storage device is usually used together with a host system so that the host system can write data into or read data from the flash memory storage device. Besides, a flash memory storage device may also include an embedded flash memory and a software that can be executed by a host system and act as a controller of the embedded flash memory.

Figure 2A:
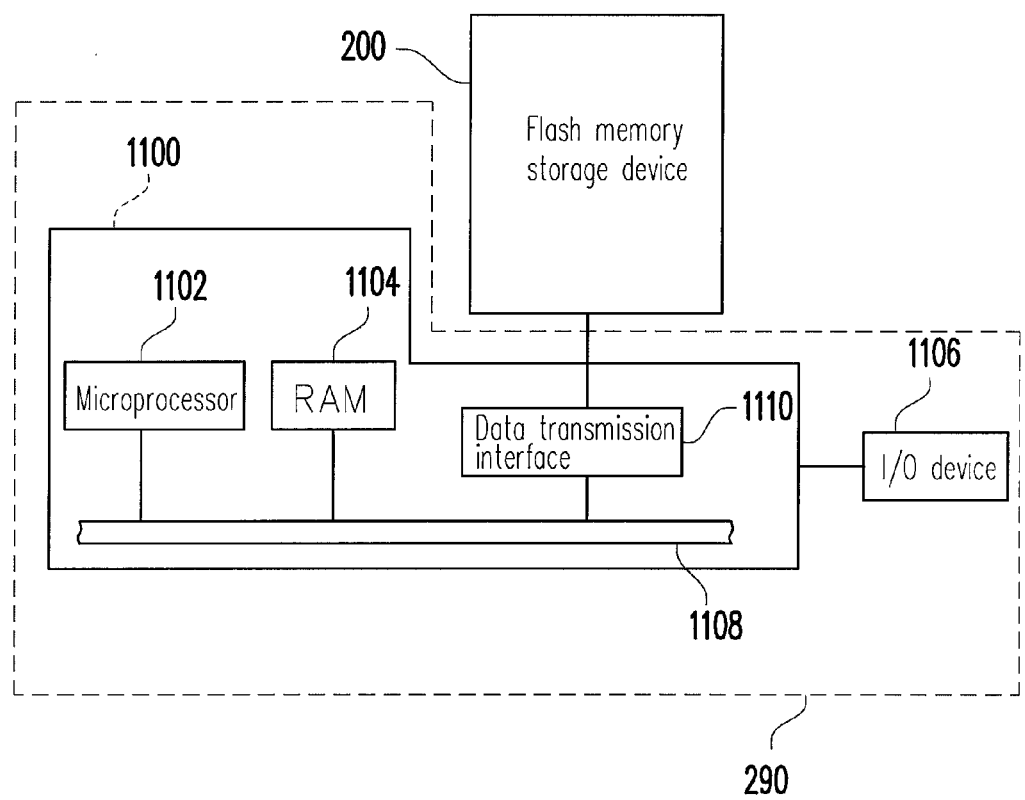
FIG. 2A illustrates a host system coupled to a flash memory storage device according to an embodiment of the present invention.

FIG. 2A illustrates a host system with a flash memory storage device according to an embodiment of the present invention.

Figure 2B:
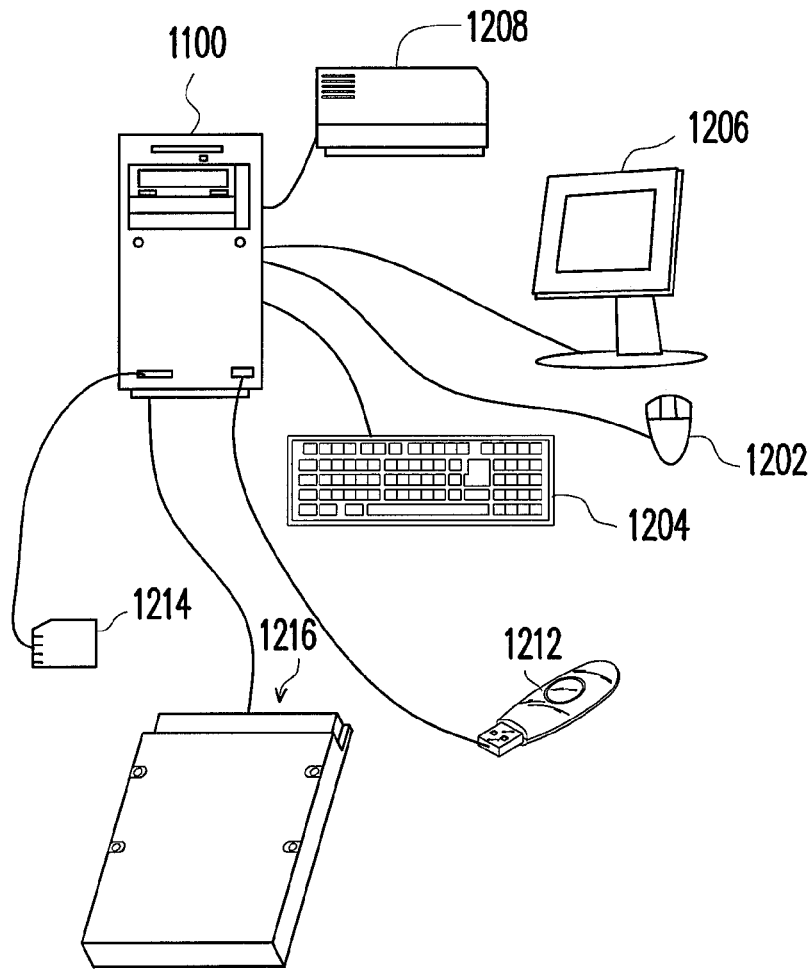
FIG. 2B is a diagram of a computer, an input/output device, and a flash memory storage device according to an exemplary embodiment of the present invention.

Referring to FIG. 2A, the host system 290 includes a computer 1100 and an input/output (I/O) device 1106. The computer 1100 includes a microprocessor 1102, a random access memory (RAM) 1104, a system bus 1108, and a data transmission interface 1110. The I/O device 1106 includes a mouse 1202, a keyboard 1204, a display 1206, and a printer 1208 as shown in FIG. 2B. It should be understood that the devices illustrated in FIG. 2B are not intended to limiting the I/O device 1106, and the I/O device 1106 may further include other devices.

In the present embodiment, the flash memory storage device 200 is coupled to other devices of the host system 290 through the data transmission interface 1110. Data can be written into or read from the flash memory storage device 200 through the operations of the microprocessor 1102, the RAM 1104, and the I/O device 1106. The flash memory storage device 200 may be a flash drive 1212, a memory card 1214, or a solid state drive (SSD) 1216 as shown in FIG. 2B.

Figure 2C:
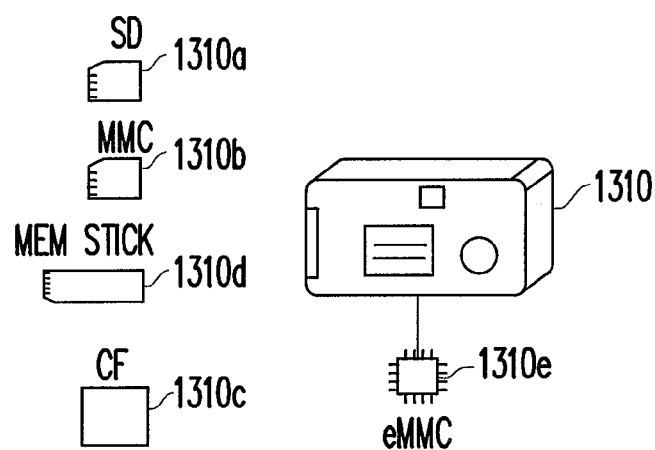
FIG. 2C is a diagram of a host system with a flash memory storage device according to another exemplary embodiment of the present invention.

Generally speaking, the host system 290 may be any system for storing data. Even though the host system 290 is described as a computer system in the present exemplary embodiment, in another exemplary embodiment of the present invention, the host system 290 may be a digital camera, a video camera, a telecommunication device, an audio player, or a video player. For example, if the host system 290 is a digital camera (video camera) 1310, the flash memory storage device is then a Secure Digital (SD) card 1310a, a Multi Media Card (MMC) 1310b, a Compact Flash (CF) card 1310c, a memory stick 1310d, or an embedded storage device 1310e (as shown in FIG. 2C) used in the digital camera 1310. The embedded storage device 1310e includes an embedded MMC (eMMC). It should be mentioned that the eMMC is directly coupled to a substrate of the host system.

Figure 2D:
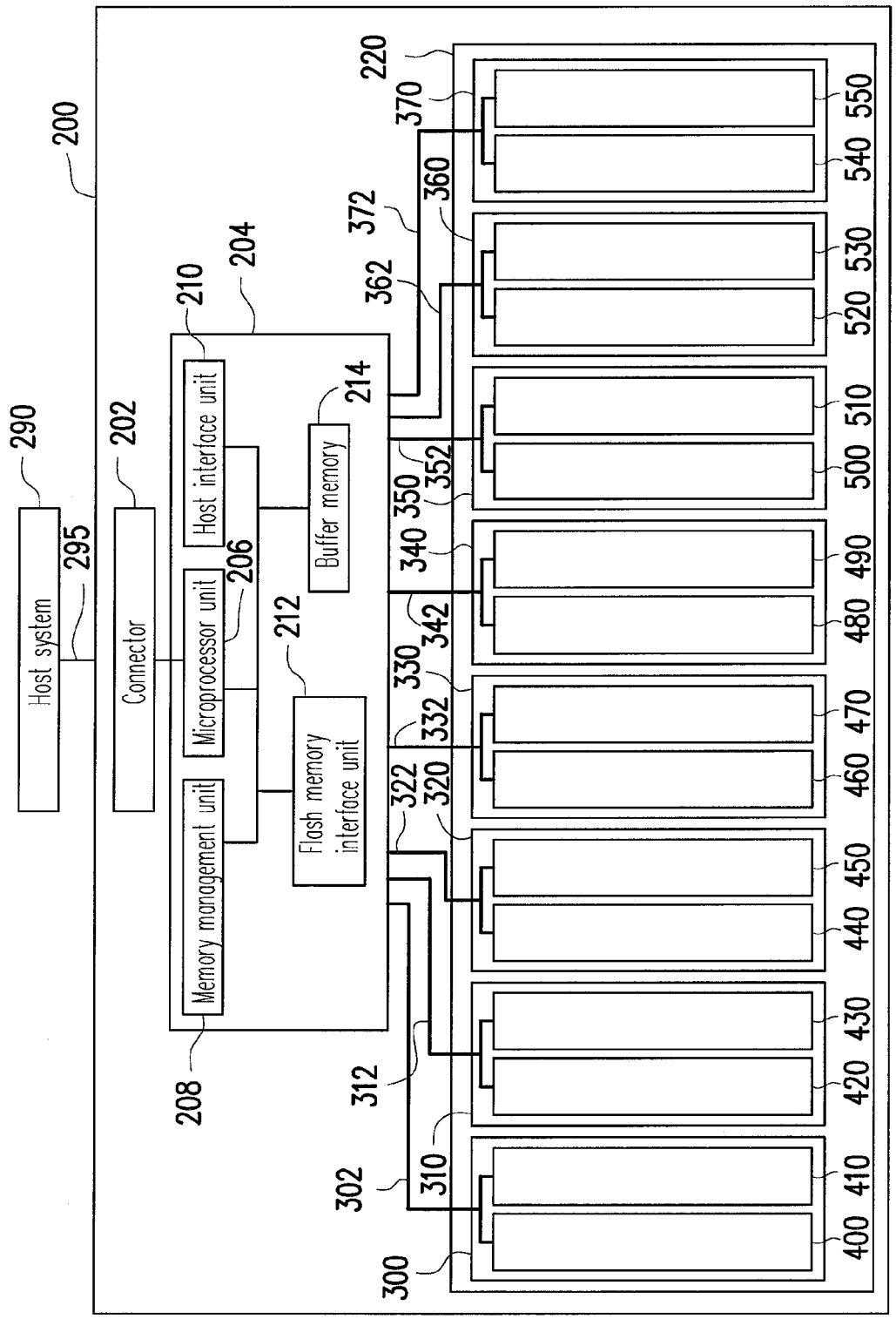
FIG. 2D is a schematic block diagram of a flash memory storage device according to an exemplary embodiment of the present invention.

FIG. 2D is a detailed block diagram of the flash memory storage device 200 in FIG. 2A.

Referring to FIG. 2D, the flash memory storage device 200 includes a connector 202, a flash memory controller 204, and a flash memory chip 220.

The connector 202 is coupled to the flash memory controller 204 and configured to connect to the host system 290 through a bus 295. In the present exemplary embodiment, the connector 202 is a serial advanced technology attachment (SATA) connector. In particular, the connector 202 supports the native command queuing (NCQ) protocol, and the host system 290 sends write commands to the flash memory controller 204 by using the NCQ protocol. To be specific, when the host system 290 sends a plurality of host write commands to the flash memory controller 204 by using the NCQ protocol, the host system 290 first sends the host write commands all together to the flash memory controller 204, and the flash memory controller 204 responds an expected command giving sequence to the host system 290. In particular, the host system 290 only sends the write commands to be gived but not the data to be written to the flash memory controller 204 during this procedure. After that, the host system 290 sends the host write commands and the corresponding data according to the response of the flash memory controller 204, and after the flash memory controller 204 finishes executing all the host write commands, it sends the execution status of each host write command back to the host system 290. Particularly, when a program fail occurs, the host system 290 sends the host write command and data corresponding to the program fail to the flash memory controller 204 again according to the response message (i.e., the execution status) of the flash memory controller 204. Or, in another exemplary embodiment of the present invention, when a program fail occurs, the host system 290 sends all the host write commands and data to the flash memory controller 204 again.

In addition, it should be understood that in the present exemplary embodiment, the connector 202 is a SATA connector supporting the NCQ protocol. However, the present invention is not limited thereto, and the connector 202 may also be other connectors supporting the NCQ protocol.

The flash memory controller 204 executes a plurality of logic gates or control commands implemented in a hardware or firmware form and performs various data operations to the flash memory chip 220 according to commands of the host system 290. The flash memory controller 204 includes a microprocessor unit 206, a memory management unit 208, a host interface unit 210, a flash memory interface unit 212, and a buffer memory 214.

The microprocessor unit 206 is the main control unit of the flash memory controller 204, and which cooperates with the memory management unit 208, the host interface unit 210, the flash memory interface unit 212, and the buffer memory 214 to carry out various operations of the flash memory storage device 200.

The memory management unit 208 is coupled to the microprocessor unit 206, and executes a program command giving method and a block management mechanism according to the present exemplary embodiment. Below, the operation of the memory management unit 208 will be described in detail with reference to accompanying drawings.

In the present exemplary embodiment, the memory management unit 208 is implemented in the flash memory controller 204 as a firmware form. For example, the memory management unit 208 including a plurality of control commands is burned into a program memory (for example, a read only memory (ROM)), and the program memory is embedded into the flash memory controller 204. When the flash memory storage device 200 is in operation, the control commands of the memory management unit 208 are executed by the microprocessor unit 206 to accomplish the program command giving method and the block management mechanism provided by the present invention.

In another exemplary embodiment of the present invention, the control commands of the memory management unit 208 may also be stored in a specific area (for example, a system area exclusively used for storing system data in a flash memory chip) of the flash memory chip 220 as program codes. Similarly, the control commands of the memory management unit 208 are executed by the microprocessor unit 206 when the flash memory storage device 200 is in operation. Additionally, in yet another exemplary embodiment of the present invention, the memory management unit 208 may also be implemented in the flash memory controller 204 in a hardware form.

The host interface unit 210 is coupled to the microprocessor unit 206 and configured to receive and identify commands and data received from the host system 290. Namely, the commands and data sended by the host system 290 are passed to the microprocessor unit 206 through the host interface unit 210. In the present exemplary embodiment, the host interface unit 210 is a SATA interface corresponding to the connector 202. However, the present invention is not limited thereto, and the host interface unit 210 may also be other suitable data transmission interfaces.

The flash memory interface unit 212 is coupled to the microprocessor unit 206 and configured to access the flash memory chip 220. Namely, data to be written into the flash memory chip 220 is converted by the flash memory interface unit 212 into a format acceptable to the flash memory chip 220.

The buffer memory 214 is coupled to the microprocessor unit 206 and configured to temporarily store data and commands from the host system 290 or data from the flash memory chip 220.

In addition, even though not described in the present exemplary embodiment, the flash memory controller 204 may further include some general function modules, such as an error correction unit and a power management unit.

The flash memory chip 220 is coupled to the flash memory controller 204 for storing data. The flash memory chip 220 includes a $0^{th}$ flash memory module 300, a $1^{st}$ flash memory module 310, a $2^{nd}$ flash memory module 320, a $3^{rd}$ flash memory module 330, a $4^{th}$ flash memory module 340, a $5^{th}$ flash memory module 350, a $6^{th}$ flash memory module 360, and a $7^{th}$ flash memory module 370. In the present exemplary embodiment, the $0^{th}$ flash memory module 300, the $1^{st}$ flash memory module 310, the $2^{nd}$ flash memory module 320, the $3^{rd}$ flash memory module 330, the $4^{th}$ flash memory module 340, the 5th flash memory module 350, the 6th flash memory module 360, and the 7th flash memory module 370 are multi level cell (MLC) NAND flash memory modules. However, the present invention is not limited thereto, and the 0th flash memory module 300, the 1st flash memory module 310, the 2nd flash memory module 320, the 3rd flash memory module 330, the 4th flash memory module 340, the 5th flash memory module 350, the 6th flash memory module 360, and the 7th flash memory module 370 may also be single level cell (SLC) NAND flash memory modules.

In the present exemplary embodiment, the 0th flash memory module 300, the 1st flash memory module 310, the 2nd flash memory module 320, the 3rd flash memory module 330, the 4th flash memory module 340, the 5th flash memory module 350, the 6th flash memory module 360, and the 7th flash memory module 370 are respectively coupled to the flash memory controller 204. To be specific, the flash memory interface unit 212 of the flash memory controller 204 transmits data to the 0th flash memory module 300, the 1st flash memory module 310, the 2nd flash memory module 320, the 3rd flash memory module 330, the 4th flash memory module 340, the 5th flash memory module 350, the 6th flash memory module 360, and the 7th flash memory module 370 respectively through a 0th data input/output bus 302, a 1st data input/output bus 312, a 2nd data input/output bus 322, a 3rd data input/output bus 332, a 4th data input/output bus 342, a 5th data input/output bus 352, a 6th data input/output bus 362, and a 7th data input/output bus 372.

In the present exemplary embodiment, the 0th flash memory module 300 includes a 0th flash memory die 400 and a 1st flash memory die 410, the 1st flash memory module 310 includes a 2nd flash memory die 420 and a 3rd flash memory die 430, the 2nd flash memory module 320 includes a 4th flash memory die 440 and a 5th flash memory die 450, the 3rd flash memory module 330 includes a 6th flash memory die 460 and a 7th flash memory die 470, the 4th flash memory module 340 includes an 8th flash memory die 480 and a 9th flash memory die 490, the 5th flash memory module 350 includes a 10th flash memory die 500 and an 11th flash memory die 510, the 6th flash memory module 360 includes a 12th flash memory die 520 and a 13th flash memory die 530, and the 7th flash memory module 370 includes a 14th flash memory die 540 and a 15th flash memory die 550.

It should be mentioned that in the present exemplary embodiment, the 0th data input/output bus 302, the 1st data input/output bus 312, the 2nd data input/output bus 322, the 3rd data input/output bus 332, the 4th data input/output bus 342, the 5th data input/output bus 352, the 6th data input/output bus 362, and the 7th data input/output bus 372 are respectively configured between the 0th flash memory module 300, the 1st flash memory module 310, the 2nd flash memory module 320, the 3rd flash memory module 330, the 4th flash memory module 340, the 5th flash memory module 350, the 6th flash memory module 360, and the 7th flash memory module 370 and the flash memory controller 204, so that the memory management unit 208 can simultaneously transmit data to the flash memory modules through the corresponding data input/output buses in a parallel mode. Accordingly, the access efficiency is improved. In addition, each flash memory module includes two flash memory dies such that the memory management unit 208 can transmit data to the two flash memory dies in the same flash memory module in an interleave mode. Accordingly, the access efficiency is further improved. To be more specific, as described above, the procedure for writing data into a flash memory die can be divided into the data transferring stage and the data programming stage, and in the example of transmitting data to two flash memory dies through the same data input/output bus, the interleave mode is to transmit data to one of the two flash memory dies when the other flash memory die is in the data programming stage.

Figure 3:
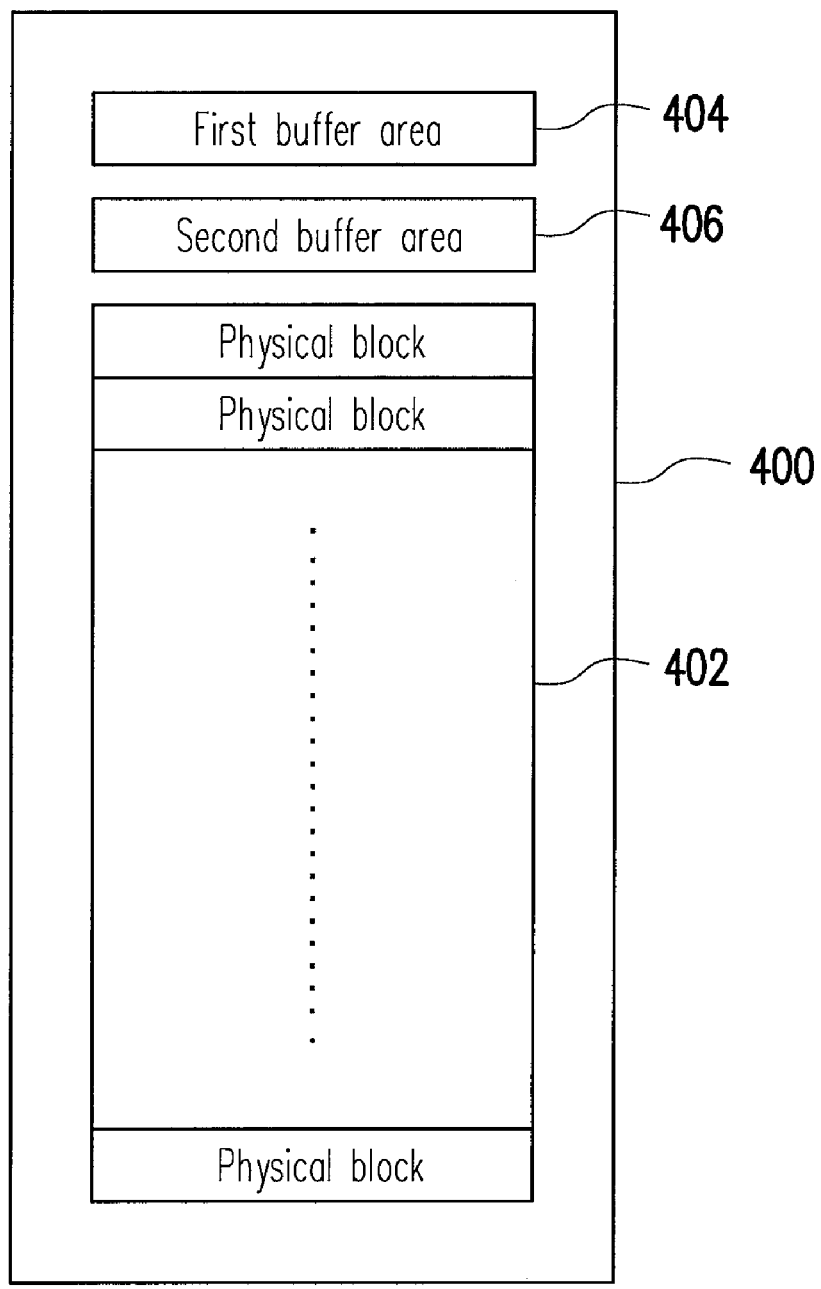
FIG. 3 is a schematic block diagram of a flash memory die according to an exemplary embodiment of the present invention.

FIG. 3 is a schematic block diagram of a flash memory die according to an exemplary embodiment of the present invention. Herein, the 0th flash memory die 400, the 1st flash memory die 410, the 2nd flash memory die 420, the 3rd flash memory die 430, the 4th flash memory die 440, the 5th flash memory die 450, the 6th flash memory die 460, the 7th flash memory die 470, the 8th flash memory die 480, the 9th flash memory die 490, the 10th flash memory die 500, the 11th flash memory die 510, the 12th flash memory die 520, the 13th flash memory die 530, the 14th flash memory die 540, and the 15th flash memory die 550 have the same structure and operation pattern. Accordingly, the 0th flash memory die 400 will be described below as an example.

Referring to FIG. 3, the 0th flash memory die 400 includes a storage area 402, a first buffer area 404, and a second buffer area 406.

The storage area 402 includes a plurality of physical blocks and is configured to store data. Physical block is the smallest erasing unit. Namely, each physical block contains the least number of memory cells that are erased together. Each physical block has several pages. In the present exemplary embodiment, page is the smallest programming unit. In other words, page is the smallest unit for writing or reading data. Each page usually includes a user data area and a redundant area, wherein the user data area is configured to store user data, and the redundant area is configured to store system data (for example, an error checking and correcting (ECC) code).

It should be mentioned that the physical blocks in the 0th flash memory die 400, the 1st flash memory die 410, the 2nd flash memory die 420, the 3rd flash memory die 430, the 4th flash memory die 440, the 5th flash memory die 450, the 6th flash memory die 460, the 7th flash memory die 470, the 8th flash memory die 480, the 9th flash memory die 490, the 10th flash memory die 500, the 11th flash memory die 510, the 12th flash memory die 520, the 13th flash memory die 530, the 14th flash memory die 540, and the 15th flash memory die 550 are grouped by the memory management unit 208 into a plurality of physical units for writing, reading, and erasing data. In particular, each physical unit is composed of the physical blocks in different flash memory dies so that the memory management unit 208 can access the flash memory dies in aforementioned parallel mode and interleave mode, so as to improve the access efficiency.

Moreover, because the memory cells in a flash memory can only be programmed from "1" to "0", data in a physical block has to be erased before the physical block is updated. However, since data is written into a flash memory in unit of pages and is erased from the same in unit of physical blocks, the physical blocks in the storage area 402 are alternatively used for storing data. To be specific, the memory management unit 208 logically groups the physical units into a system area, a data area, a spare area, and a replacement area. The physical units in the system area are used to store important information related to the flash memory storage device 200, and the physical units in the replacement area are used to replace damaged physical units in the data area or the spare area. Thus, the host system 290 cannot access the physical units in the system area or the replacement area in a general access status. The physical units in the data area are used to store data written by host write commands, and the physical units in the spare area are used to substitute the physical units in the data area when the host write commands are executed. For example, when the flash memory storage device 200 receives a host write command from the host system 290 and accordingly is about to update (or write data into) a specific page of a specific physical unit in the data area, the memory management unit 208 selects a physical unit from the spare area and writes the old valid data in the physical unit to be updated and the new data into the physical unit selected from the spare area. After that, the memory management unit 208 logically links the physical unit containing the old valid data and the new data to the data area, then erases the physical unit to be updated in the data area and logically links it to the spare area. In order to allow the host system 290 to smoothly access the physical units that are alternatively used for storing data, the flash memory storage device 200 provides logical addresses to the host system 290. Namely, the flash memory storage device 200 reflects the alternation of the physical units by recording and updating the mapping relationship between the logical addresses and the physical units in the data area in a logical address-physical address mapping table, so that the host system 290 needs only to access the provided logical address while the flash memory storage device 200 writes data into or reads data from the physical address of the corresponding physical unit according to the logical address-physical address mapping table.

The first buffer area 404 and the second buffer area 406 are used to temporarily store data transmitted by the flash memory controller 204. As described above, the procedure for writing data into the $0^{th}$ flash memory die 400 includes the data transferring stage and the data programming stage. During the data transferring stage, the flash memory controller 204 transmits the data into the first buffer area 404. After that, the data is moved to the second buffer area 406. During the data programming stage, the data is written from the second buffer area 406 into the storage area 402. Herein the first buffer area 404 is also referred to as a data cache area, and the second buffer area 406 is also referred to as a cache buffer area, wherein each of the first buffer area 404 and the second buffer area 406 can temporarily store data of one page in correspondence with the programming unit (i.e., page).

To be specific, when the memory management unit 208 receives a host write command and data from the host system 290 and accordingly is about to write the data into the $0^{th}$ flash memory die 400, the memory management unit 208 gives a program command through the flash memory interface unit 212 and the data input/output bus 302. The data to be written in the program command is transmitted from the buffer memory 214 to the first buffer area 404 and then moved from the first buffer area 404 to the second buffer area 406. Finally, the data is programmed from the second buffer area 406 into the storage area 402. Particularly, in the present exemplary embodiment, the memory management unit 208 programs the data by using only a program command composed of strings such as "command W1", "physical address", "data", and "command W3", etc. The memory management unit 208 requests the $0^{th}$ flash memory die 400 to get ready for data programming procedure through the "command W1", provides the $0^{th}$ flash memory die 400 with the physical address to be programmed through the "physical address", provides the $0^{th}$ flash memory die 400 with the data to be programmed through the "data", and requests the $0^{th}$ flash memory die 400 to start executing the programming procedure through the "command W3". Herein, when the "command W3" in the program command is used, the flash memory controller 204 receives the acknowledgement message from the $0^{th}$ flash memory die 400 (and accordingly can process the next command) after the data is moved from the first buffer area 404 to the second buffer area 406.

For example, if the flash memory controller 204 receives two continuous host write commands from the host system 290 by using the NCQ protocol and accordingly is about to programming two pages of the $0^{th}$ flash memory die 400, because the $0^{th}$ flash memory die 400 has two buffer areas (i.e., the first buffer area 404 and the second buffer area 406), the first buffer area 404 can be cleared and used to receive the data of the second host write command after the $0^{th}$ flash memory die 400 has moved the data of the first host write command from the first buffer area 404 to the second buffer area 406. In particular, during the $0^{th}$ flash memory die 400 programs the data of the first host write command from the second buffer area 406 into the storage area 402, the first buffer area 404 receives the data of the next program command (i.e., the second host write command). Namely, by using the "command W3", the memory management unit 208 can process the second host write command and transmit the data of the second host write command into the first buffer area 404 before the $0^{th}$ flash memory die 400 finishes executing the first host write command. Thus, in the $0^{th}$ flash memory die 400 the data programming stage for the data of the first host write command and the data transferring stage for the data of the second host write command are simultaneously executed. Accordingly, the time for executing the host write commands is shortened.

Figure 4A:
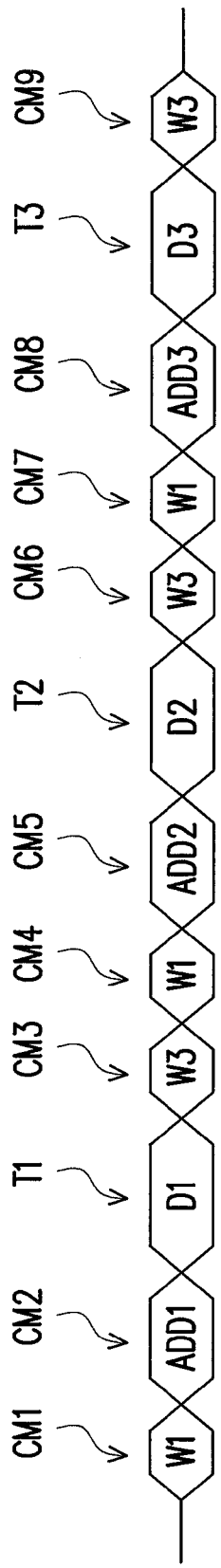
FIG. 4A illustrates an example of how a flash memory controller gives cache program commands through data input/output buses according to an exemplary embodiment of the present invention.
Figure 4B:
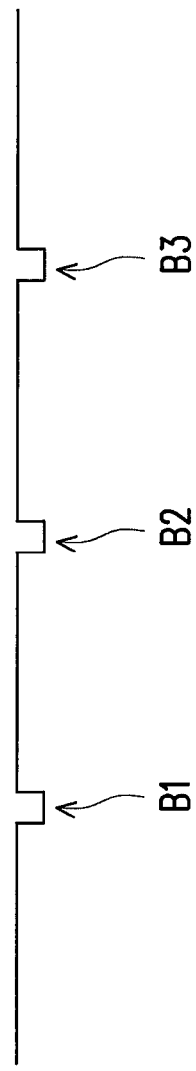
FIG. 4B is an operation timing diagram of a flash memory chip when the cache program commands in FIG. 4A are executed.

FIG. 4A illustrates an example of how a flash memory controller gives cache program commands through data input/output buses according to an exemplary embodiment of the present invention, and FIG. 4B is an operation timing diagram of a flash memory chip when the cache program commands in FIG. 4A are executed. In the example illustrated in FIG. 4A and FIG. 4B, the memory management unit 208 receives three host write commands from the host system 290 by using the NCQ protocol. Herein the logical addresses to be written by the three host write commands are continuous logical addresses, and the memory management unit 208 generates a command giving sequence according to the sequence of these logical addresses such that the host system 290 can give the three host write commands to the flash memory storage device 200 according to the command giving sequence generated by the memory management unit 208, wherein the first host write command includes a logical address and data D1, the $2^{nd}$ host write command includes a logical address and data D2, the $3^{rd}$ host write command includes a logical address and data D3, and the logical addresses to be written by the three host write commands are mapped to physical blocks in the $0^{th}$ flash memory die 400.

Referring to FIG. 4A and FIG. 4B, after the memory management unit 208 of the flash memory controller 204 receives the first host write command and the data to be written from the host system 290 according to the command giving sequence, the memory management unit 208 gives a cache program command composed of "command W1", "ADD1", "data D1", and "command W3" (as the command CM1, the command CM2, the transmission T1, and the command CM3 illustrated in FIG. 4A) to the flash memory chip 220 according to the logical address in the first host write command and the data D1, wherein "ADD1" represents the physical address for programming the data. Namely, the memory management unit 208 sends the physical address corresponding to the logical address in the host write command to the $0^{th}$ flash memory die 400 according to the logical address-physical address mapping table (i.e., the command CM2) and transmits the data D1 into the first buffer area 404 (i.e., the transmission T1). After that, the $0^{th}$ flash memory die 400 moves the data D1 from the first buffer area 404 to the second buffer area 406 according to the cache program command (i.e., the command CM3) and then programs the data D1 from the second buffer area 406 into the storage area 402. In particular, the $0^{th}$ flash memory die 400 is in a busy status when it starts to execute the command CM3, and the $0^{th}$ flash memory die 400 returns to a ready status after moving the data D1 from the first buffer area 404 to the second buffer area 406 (i.e., a busy time B1). Once the $0^{th}$ flash memory die 400 returns to the ready status, the memory management unit 208 responds to the host system 290 to receive the second host write command and the data D2 from the host system 290, and the memory management unit 208 gives a cache program command composed of "command W1", "ADD2", "data D2", and "command W3" (as the command CM4, the command CM5, the transmission T2, and the command CM6 in FIG. 4A) to the $0^{th}$ flash memory die 400 to transmit the data D2 of the second host write command to the first buffer area 404 (i.e., the transmission T2). Herein the data programming stage for the data D1 and the data transferring stage for the data D2 are executed simultaneously. Namely, because the $0^{th}$ flash memory die 400 has two buffer areas (i.e., the first buffer area 404 and the second buffer area 406), after the data is moved from the first buffer area 404 to the second buffer area 406 through the cache program command, the second buffer area 406 is used for programming the data into the storage area 402 while the first buffer area 404 is used for receiving data from the buffer memory 214.

Next, after the data D2 is transmitted and the $0^{th}$ flash memory die 400 finishes programming the data D1, the $0^{th}$ flash memory die 400 moves the data D2 from the first buffer area 404 to the second buffer area 406 according to the command CM6 and then programs the data D2 from the second buffer area 406 into the storage area 402. The $0^{th}$ flash memory die 400 is in the busy status when it starts to execute the command CM6, and the $0^{th}$ flash memory die 400 returns to the ready status after it moves the data D2 from the first buffer area 404 to the second buffer area 406 (i.e., the busy time B2). Similarly, when the $0^{th}$ flash memory die 400 returns to the ready status, the memory management unit 208 responds to the host system 290 to receive the third host write command and the data D3 from the host system 290 and gives a cache program command composed of "command W1", "ADD3", "data D3", and "command W3" (as the command CM7, the command CM8, the transmission T3, and the command CM9 illustrated in FIG. 4A) to the $0^{th}$ flash memory die 400 to transmit the data D3 of the third host write command into the first buffer area 404 (i.e., the transmission T3).

Next, after the data D3 is transmitted and the $0^{th}$ flash memory die 400 finishes programming the data D2, the $0^{th}$ flash memory die 400 moves the data D3 from the first buffer area 404 to the second buffer area 406 according to the command CM9 and then programs the data D3 from the second buffer area 406 into the storage area 402. Similarly, the $0^{th}$ flash memory die 400 is in the busy status when it starts to execute the command CM9, and the $0^{th}$ flash memory die 400 returns to the ready status after it moves the data D3 from the first buffer area 404 to the second buffer area 406, (i.e., the busy time B3).

It should be mentioned that the acknowledgement message indicating that the $0^{th}$ flash memory die 400 returns to the ready status received by the memory management unit 208 from the $0^{th}$ flash memory die 400 includes a cache status bit and a busy status bit, wherein the cache status bit indicates whether the $0^{th}$ flash memory die 400 is ready for receiving next data, and the busy status bit indicates whether the 0th flash memory die 400 is currently in the busy status. Accordingly, the flash memory controller 204 can correctly determine whether the $0^{th}$ flash memory die 400 is programming data according to the information in the acknowledgement message. In the example illustrated in FIG. 4A and FIG. 4B, even though the $0^{th}$ flash memory die 400 has returned to the ready status after the busy time B3, because the memory management unit 208 has finished giving program commands with respect to all the host write commands received by using the NCQ protocol, the memory management unit 208 sends the execution status of each host write command to the host system 290 after it determines that the $0^{th}$ flash memory die 400 has finished programming all the data (i.e., the $0^{th}$ flash memory die 400 is not in the busy status).

Figure 5:
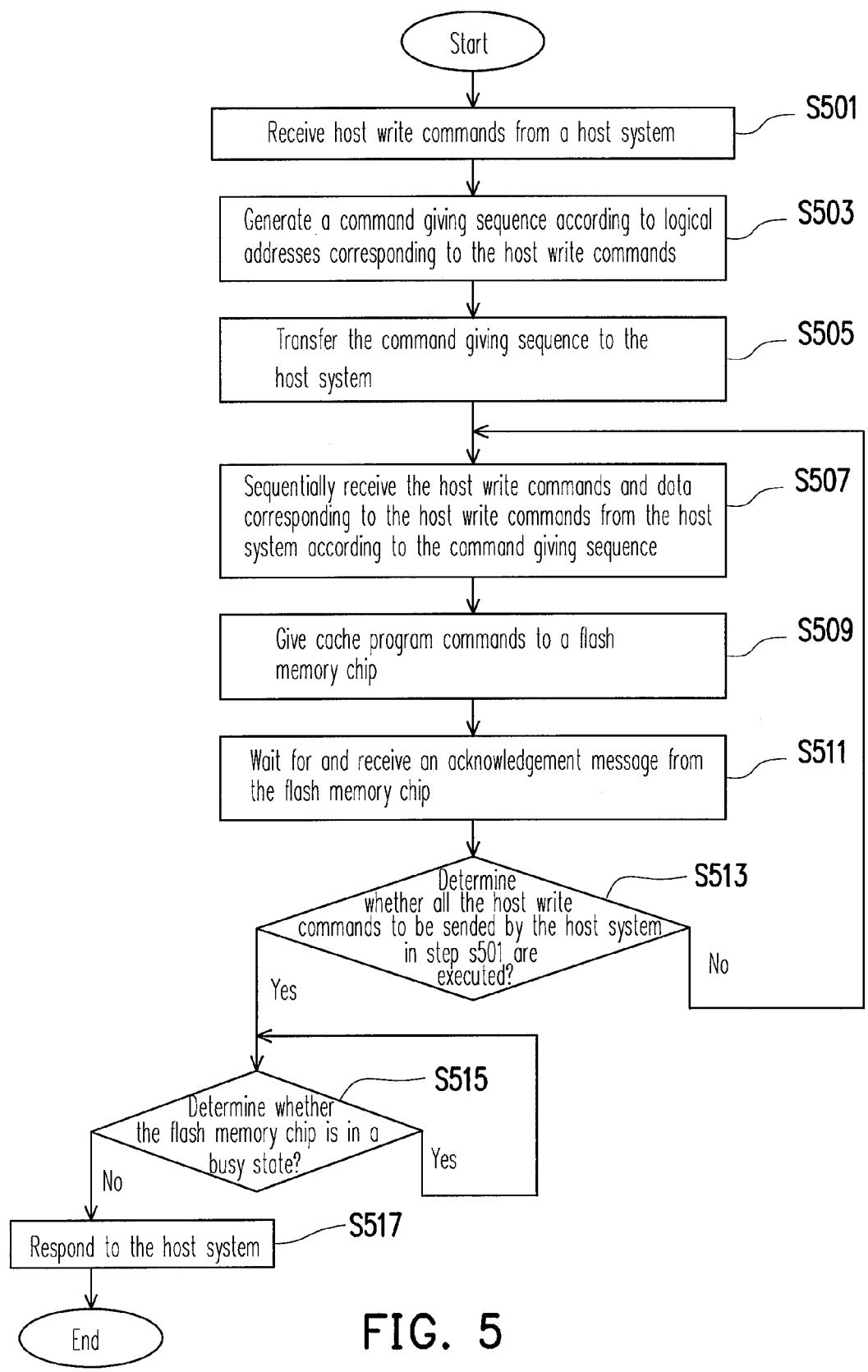
FIG. 5 is a flowchart of a method for giving program commands according to an exemplary embodiment of the present invention.

FIG. 5 is a flowchart of a program command giving method according to an exemplary embodiment of the present invention.

Referring to FIG. 5, first, in step S501, the flash memory storage device 200 receives host write commands from the host system 290. To be specific, in the present exemplary embodiment, the host system 290 sends a plurality of host write commands (for example, the two host write commands in FIG. 4A) by using the NCQ protocol. Thus, in step S501, the flash memory storage device 200 first receives the host write commands to be gived by the host system 290.

Then, in step S503, the memory management unit 208 generates a command giving sequence according to the logical addresses corresponding to the received host write commands. To be specific, in the present exemplary embodiment, after receiving the host write commands from the host system 290 by using the NCQ protocol, the memory management unit 208 sorts the host write commands according to the logical addresses in these host write commands, so as to determine an expected sequence for executing the host write commands. It should be mentioned that in another exemplary embodiment of the present invention, the memory management unit 208 may not sort the host write commands but generates the command giving sequence according to the sequence in which the host system 290 originally gives the host write commands.

In step S505, the memory management unit 208 sends the command giving sequence to the host system 290. After that, in step S507, the memory management unit 208 receives the host write commands and data corresponding to the host write commands one by one from the host system 290 according to the command giving sequence.

Thereafter, in step S509, the memory management unit 208 gives a cache program command (for example, the program command composed of "command W1", "physical address", "data", and "command W3", etc) to the flash memory chip 220. After that, in step S511, the memory management unit 208 waits for and receives an acknowledgement message from the flash memory chip 220, and in step S513, the memory management unit 208 determines whether all the host write commands received from the host system 290 in step S501 have been executed. If it is determined in step S513 that not all the host write commands received from the host system 290 in step S501 has been executed, step S507 is executed to receive the next host write command.

If it is determined in step S513 that all the host write commands received from the host system 290 in step S501 have been executed, in step S515, whether the flash memory chip 220 is in a busy status is determined. If it is determined in step S515 that the flash memory chip 220 is not in the busy status, step S517 is executed to respond to the host system 290 and the procedure illustrated in FIG. 5 is ended. Otherwise, step S515 is executed again.

As described above, when a plurality of host write commands is received from the host system 290 by using the NCQ protocol, the memory management unit 208 sends the execution statuses (for example, whether any program fail occurs) of all the host write commands to the host system 290 after all the host write commands gived by using the NCQ protocol are executed. In particular, the memory management unit 208 only sends the execution statuses of all the host write commands to the host system 290 after the flash memory chip 220 finishes executing the last host write command and from busy status returns to the ready status.

The previously described exemplary embodiments of the present invention have many the following advantages, wherein the advantages not required in all versions of the invention. For example, in the program command giving method provided by exemplary embodiments of the present invention, a flash memory chip is programmed by using only cache program commands so that the time for executing host write commands is greatly shortened. In addition, in the program command giving method provided by exemplary embodiments of the present invention, write commands are transmitted from a host system to a flash memory storage device by using the NCQ protocol so that the host system can correctly determine the actual execution status of each host write command. Moreover, in the exemplary embodiments described above, the giving sequence of the host write commands is determined by using the NCQ protocol according to the logical addresses corresponding to the host write commands, so that the time for executing the host write commands is further shortened.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A program command giving method, for writing data from a host system into a flash memory chip, the program command giving method comprising:

providing a flash memory controller;

receiving a plurality of host write commands from the host system by using a native command queuing (NCQ) protocol by the flash memory controller;

generating a command giving sequence according to the host write commands by the flash memory controller; and sequentially receiving the host write commands and data corresponding to the host write commands from the host system according to the command giving sequence, and respectively giving a cache program command to the flash memory chip to write the data into the flash memory chip, wherein the flash memory chip comprises a first buffer area, a second buffer area, and a storage area, and the step of sequentially receiving the host write commands and the data corresponding to the host write commands from the host system according to the command giving sequence and respectively giving the cache program command to the flash memory chip to write the data into the flash memory chip comprises:

receiving first data corresponding to a first host write command from the host system;

giving the cache program command to the flash memory chip by the flash memory controller to transmit the first data into the first buffer area, wherein the first data is moved from the first buffer area to the second buffer area and written from the second buffer area into the storage area;

receiving second data corresponding to a second host write command from the host system; and giving the cache program command to the flash memory chip by the flash memory controller to transmit the second data into the first buffer area, wherein the second data is moved from the first buffer area to the second buffer area and written from the second buffer area into the storage area, wherein the second data is transmitted into the first buffer area after the first data is moved from the first buffer area to the second buffer area.

2. The program command giving method according to claim 1, wherein the step of generating the command giving sequence according to the host write commands by the flash memory controller comprises:

determining the command giving sequence by the flash memory controller according to a sequence of sending the host write commands by the host system.

3. The program command giving method according to claim 1, wherein the step of generating the command giving sequence according to the host write commands by the flash memory controller comprises:

determining the command giving sequence by the flash memory controller according to a plurality of logical addresses corresponding to the host write commands.

4. The program command giving method according to claim 1, further comprising:

sending execution statuses of the host write commands to the host system after finishing to execute all the host write commands.

5. The program command giving method according to claim 4, wherein when the execution statuses of the host write commands comprise at least one program fail, the host write command and the data corresponding to the program fail are received again from the host system by the flash memory controller.

6. The program command giving method according to claim 4, wherein when the execution statuses of the host write commands comprise at least one program fail, all the host write commands and the data are received again from the host system by the flash memory controller.

7. A flash memory controller, for writing data from a host system into a flash memory chip, the flash memory controller comprising:

a microprocessor unit;

a buffer memory, coupled to the microprocessor unit;

a flash memory interface unit, coupled to the microprocessor unit, and configured to connect to the flash memory chip;

a host interface unit, coupled to the microprocessor unit, and configured to connect to the host system, wherein the host interface unit supports a NCQ protocol; and a memory management unit, coupled to the microprocessor unit, and configured to receive a plurality of host write commands from the host system through the host interface unit by using the NCQ protocol, wherein the memory management unit generates a command giving sequence system according to the host write commands, wherein the memory management unit sequentially receives the host write commands and data corresponding to the host write commands from the host system through the host interface unit according to the command giving sequence and respectively gives a cache program command to the flash memory chip to write the data into the flash memory chip, wherein the flash memory chip comprises a first buffer area, a second buffer area, and a storage area, and wherein the memory management unit receives first data corresponding to a first host write command from the host system, wherein the memory management unit gives the cache program command to the flash memory chip to transmit the first data from the buffer memory into the first buffer area, wherein the first data is moved from the first buffer area to the second buffer area and written from the second buffer area into the storage area, wherein the memory management unit receives second data corresponding to a second host write command from the host system, wherein the memory management unit gives the cache program command to the flash memory chip to transmit the second data from the buffer memory into the first buffer area, wherein the second data is moved from the first buffer area to the second buffer area and written from the second buffer area into the storage area, and wherein the second data is transmitted into the first buffer area after the first data is moved from the first buffer area to the second buffer area.

8. The flash memory controller according to claim 7, wherein the memory management unit determines the command giving sequence according to a sequence of sending the host write commands by the host system.

9. The flash memory controller according to claim 7, wherein the memory management unit determines the command giving sequence according to a plurality of logical addresses corresponding to the host write commands.

10. The flash memory controller according to claim 7, wherein the memory management unit sends execution statuses of the host write commands to the host system after the memory management unit finishes executing all the host write commands.

11. The flash memory controller according to claim 10, wherein when the execution statuses of the host write commands comprise at least one program fail, the memory management unit receives the host write command and the data corresponding to the program fail from the host system again.

12. The flash memory controller according to claim 10, wherein when the execution statuses of the host write commands comprise at least one program fail, the memory management unit receives all the host write commands and the data from the host system again.

13. A flash memory storage system, for storing data from a host system, the flash memory storage system comprising:
a connector, configured to couple to the host system, wherein the connector supports a NCQ protocol;
a flash memory chip; and
a flash memory controller, coupled to the connector and the flash memory chip, and configured to receive a plurality of host write commands from the host system through the connector by using the NCQ protocol,
wherein the flash memory controller generates a command giving sequence according to the host write commands,
wherein the flash memory controller sequentially receive the host write commands and data corresponding to the host write commands from the host system according to the command giving sequence through the connector and respectively gives a cache program command to the flash memory chip to write the data into the flash memory chip,
wherein the flash memory chip comprises a first buffer area, a second buffer area, and a storage area, and the flash memory storage system further comprises a buffer memory,
wherein the flash memory controller receives first data corresponding to a first host write command from the host system,
wherein the flash memory controller gives the cache program command to the flash memory chip to transmit the first data into the first buffer area, wherein the first data is moved from the first buffer area to the second buffer area and written from the second buffer area into the storage area,
wherein the flash memory controller receives second data corresponding to a second host write command from the host system,
wherein the flash memory controller gives the cache program command to the flash memory chip to transmit the second data into the first buffer area, wherein the second data is moved from the first buffer area to the second buffer area and written from the second buffer area into the storage area, and
wherein the second data is transmitted into the first buffer area after the first data is moved from the first buffer area to the second buffer area.

14. The flash memory storage system according to claim 13, wherein the flash memory controller determines the command giving sequence according to a sequence of sending the host write commands by the host system.

15. The flash memory storage system according to claim 13, wherein the flash memory controller determines the command giving sequence according to a plurality of logical addresses corresponding to the host write commands.

16. The flash memory storage system according to claim 13, wherein the flash memory controller sends execution statuses of the host write commands to the host system after the flash memory controller finishes executing all the host write commands.

17. The flash memory storage system according to claim 16, wherein when the execution statuses of the host write commands comprise at least one program fail, the flash memory controller receives the host write command and the data corresponding to the program fail from the host system again.

18. The flash memory storage system according to claim 16, wherein when the execution statuses of the host write commands comprise at least one program fail, the flash memory controller receives all the host write commands and the data from the host system again.

* * * * *